US010248967B2

United States Patent
Liu et al.

(10) Patent No.: US 10,248,967 B2
(45) Date of Patent: Apr. 2, 2019

(54) COMPRESSING AN ORIGINAL QUERY WHILE PRESERVING ITS INTENT

(71) Applicant: Microsoft Technology Licensing, LLC, Redmond, WA (US)

(72) Inventors: Pengqi Liu, Beijing (CN); Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 612 days.

(21) Appl. No.: 14/866,710

(22) Filed: Sep. 25, 2015

(65) Prior Publication Data

US 2017/0091814 A1  Mar. 30, 2017

(51) Int. Cl.
*G06Q 30/02* (2012.01)
*G06F 17/30* (2006.01)

(52) U.S. Cl.
CPC ..... *G06Q 30/0255* (2013.01); *G06F 17/3066* (2013.01); *G06F 17/30867* (2013.01); *G06Q 30/0269* (2013.01)

(58) Field of Classification Search
CPC ........ G06F 17/30867; G06F 17/30864; G06Q 30/0269; G06Q 30/0255
USPC ....... 707/722, 706, 728, 748, 767, 723, 724, 707/765, 693, 694, 701, 713, 732, 734, 707/736, 737, 754, 755, 766; 705/14.54, 705/26.62, 14.39, 14.57, 26.41, 14.45, 705/14.49, 14.53, 14.58, 14.64, 14.66, 705/14.71, 26.43, 26.7, 26.8, 311, 313, 705/7.29, 7.31

See application file for complete search history.

(56) References Cited

U.S. PATENT DOCUMENTS

| | | | |
|---|---|---|---|
| 7,739,264 B2 * | 6/2010 | Jones ................ | G06Q 30/0254 705/14.52 |
| 8,510,322 B2 | 8/2013 | Ray et al. | |
| 8,612,432 B2 | 12/2013 | Kenthapadi et al. | |
| 8,812,452 B1 | 8/2014 | Hushon | |
| 8,898,140 B2 | 11/2014 | Cooper et al. | |
| 9,020,947 B2 | 4/2015 | Yan et al. | |
| 9,652,472 B2 * | 5/2017 | Tsai ................ | G06F 17/30221 |
| 2006/0212350 A1 | 9/2006 | Ellis et al. | |
| 2007/0038614 A1 * | 2/2007 | Guha ...................... | G06Q 30/02 |
| 2007/0294240 A1 | 12/2007 | Steele et al. | |
| 2009/0228353 A1 | 9/2009 | Achan et al. | |

(Continued)

FOREIGN PATENT DOCUMENTS

WO    2014153086 A2    9/2014

OTHER PUBLICATIONS

Liu et al., "Contextual Query Intent Extraction for Paid Search Selection," WWW 2015, May 18-22, 2015, 2 pages.

(Continued)

*Primary Examiner* — Jay A Morrison
*Assistant Examiner* — Ken Hoang
(74) *Attorney, Agent, or Firm* — Rainier Patents, P.S.

(57) ABSTRACT

A computer-implemented technique is described herein for shortening an original query into one or more sub-queries. The technique chooses the sub-query(ies) such that they preserve the original intent of the original query. To accomplish this goal, the technique uses graph-based analysis to generate a set of richly descriptive query-context-specific feature values for each sub-query, and then uses those feature values to score the relevance of that sub-query.

20 Claims, 11 Drawing Sheets

(56) References Cited

U.S. PATENT DOCUMENTS

| | | |
|---|---|---|
| 2011/0258212 A1* | 10/2011 | Lu .................. G06F 17/30864 707/760 |
| 2011/0270819 A1 | 11/2011 | Shen et al. |
| 2012/0166277 A1 | 6/2012 | Gnanamani et al. |
| 2012/0290575 A1 | 11/2012 | Hu et al. |
| 2013/0211914 A1 | 8/2013 | Reddy et al. |
| 2013/0232006 A1 | 9/2013 | Holcomb et al. |
| 2014/0101119 A1 | 4/2014 | Li et al. |
| 2014/0309993 A1 | 10/2014 | Goussard |
| 2015/0242510 A1* | 8/2015 | Shapira ............. G06F 17/30392 707/706 |

OTHER PUBLICATIONS

Cao, et al., "Context-Aware Query Classification," in Proceedings of the 32nd International ACM SIGIR Conference on Research and Development in Information Retrieval, Jul. 2009, 8 pages.

Brin, et al., "The Anatomy of a Large-Scale Hypertextual Web Search Engine," in Journal of Computer Networks and ISDN Systems, vol. 30, Issue 1-7, Apr. 1998, 20 pages.

Kumaran, et al., "Reducing Long Queries Using Query Quality Predictors," in Proceedings of the 32nd International ACM SIGIR Conference on Research and Development in Information Retrieval, Jul. 2009, 8 pages.

Maxwell, et al., "Compact Query Term Selection Using Topically Related Text," in Proceedings of the 36th International ACM SIGIR Conference on Research and Development in Information Retrieval, Jul. 2013, 10 pages.

Pitler, Emily, "Methods for Sentence Compression," University of Pennsylvania Department of Computer and Information Science Technical Report No. MS-CIS-10-20, Paper 929, May 2010, 33 pages.

\* cited by examiner

Pair 1:  Prior Query (Token$_{q11}$, Token$_{q12}$, .... Token$_{q1n}$)
Keyword Information (Token$_{k11}$, Token$_{k12}$, .... Token$_{k1m}$)

Pair 2:  Prior Query (Token$_{q21}$, Token$_{q22}$, .... Token$_{q2n}$)
Keyword Information (Token$_{k21}$, Token$_{k22}$, .... Token$_{k2m}$)

⋮

Pair p:  Prior Query (Token$_{qp1}$, Token$_{qp2}$, .... Token$_{qpn}$)
Keyword Information (Token$_{kp1}$, Token$_{kp2}$, .... Token$_{kpm}$)

GENERATING THE FIRST SET OF FEATURE VALUES
1102

START

FORM AN UNDIRECTED GRAPH ASSOCIATED WITH THE ORIGINAL QUERY, WHEREIN EACH NODE IN THE UNDIRECTED GRAPH REPRESENTS A TOKEN IN THE ORIGINAL QUERY, AND EACH LINK BETWEEN TWO NODES HAS A MUTUAL COHERENCE VALUE ASSOCIATED THEREWITH THAT REFLECTS A DEGREE OF COHERENCE BETWEEN A PAIR OF TOKENS ($v_i$, $v_j$) ASSOCIATED WITH THE TWO RESPECTIVE NODES
1104

FORM AN UNDIRECTED GRAPH ASSOCIATED WITH THE PARTICULAR SUB-QUERY, CORRESPONDING TO A PART OF THE UNDIRECTED GRAPH ASSOCIATED WITH THE ORIGINAL QUERY
1106

GENERATE FEATURE VALUES THAT REFLECT DIFFERENT RESPECTIVE FUNCTIONS OF THE MUTUAL COHERENCE VALUES IN THE GRAPH ASSOCIATED WITH THE ORIGINAL QUERY AND THE GRAPH ASSOCIATED WITH THE PARTICULAR SUB-QUERY
1108

END

FIG. 11

GENERATING THE SECOND SET OF FEATURE VALUES
1202

START

FORM A DIRECTED GRAPH ASSOCIATED WITH THE ORIGINAL QUERY, WHEREIN EACH NODE IN THE DIRECTED GRAPH REPRESENTS A TOKEN IN THE ORIGINAL QUERY, AND EACH LINK FROM A FIRST NODE TO A SECOND NODE HAS TRANSITION PROBABILITY VALUE ASSOCIATED THEREWITH THAT REFLECTS A PROBABILITY OF OCCURRENCE OF A TOKEN ASSOCIATED WITH THE SECOND NODE, GIVEN A TOKEN ASSOCIATED WITH THE FIRST NODE
1204

APPLY A LINK ANALYSIS ALGORITHM ON THE DIRECTED GRAPH TO GENERATE A RANKING VALUE ASSOCIATED WITH EACH TOKEN IN THE ORIGINAL QUERY, TO OVERALL PROVIDE A PLURALITY OF RANKING VALUES
1206

FORM A DIRECTED GRAPH ASSOCIATED WITH THE PARTICULAR SUB-QUERY, CORRESPONDING TO A PART OF THE DIRECTED GRAPH ASSOCIATED WITH THE ORIGINAL QUERY
1208

GENERATE FEATURE VALUES THAT REFLECT DIFFERENT RESPECTIVE FUNCTIONS OF THE RANKING VALUES IN THE GRAPH ASSOCIATED WITH THE ORIGINAL QUERY AND THE GRAPH ASSOCIATED WITH THE PARTICULAR SUB-QUERY
1210

END

FIG. 12

COMPRESSING AN ORIGINAL QUERY WHILE PRESERVING ITS INTENT

BACKGROUND

A search engine typically matches a user's query against a collection of target items (e.g., ads, web pages, etc.) by comparing the tokens of the query with the tokens associated with individual target items. The search engine then delivers one or more target items (if any) that have instances of keyword information that most closely match the query, based on any environment-specific matching criteria. In some scenarios, the target items correspond to ads having bidded keyword information associated therewith.

Many times, however, a user fails to enter a query that concisely expresses his or her intent. For example, the query may be relatively verbose and may contain words that are tangent to the user's principal search intent. As a result, the search engine may fail to locate the most relevant target items and present them to the user. The user is thereby disadvantaged because the user may be deluged with potentially irrelevant target items, to varying degrees. The user may also need to extend the length of his or her search session in hopes of finding useful target items. The search engine is disadvantaged because it wastes communication and processing resources in responding to the user in the course of the extended search session. Finally, in an advertising-related context, both advertisers and the entity which administers the search engine are disadvantaged because revenue is lost through the inefficient placement of the target items.

SUMMARY

A computer-implemented technique is described herein for compressing an original query into one or more sub-queries that preserve an intent associated with the original query. In one manner of operation, the technique involves: receiving an original query from a user device; generating plural candidate queries, each candidate query corresponding to a sub-query of the original query; generating a set of feature values for each candidate query; determining respective score values for the candidate queries using a scoring model, based on the set of feature values associated with each candidate query; selecting one or more candidate queries that most effectively express the intent associated with the original query, based on the score values associated with the candidate queries; identifying at least one target item that matches the candidate query(ies); and sending the target item(s) to the user device. In one scenario, the target item(s) may correspond to digital ads for presentation by the user device.

In one approach, the technique uses graph-based analysis to generate the feature values for each candidate query. The graph-based analysis relies on relationships among tokens expressed in a historical data set. The resultant feature values provided by the graph-based analysis are context-dependent in nature because they depend on the role that tokens play in a particular candidate query. In other words, the same tokens may play a different role in other query contexts.

The technique helps a search engine provide the most relevant target items to the user upon the user's submission of an original query. This characteristic facilitates the user's interaction with the search engine, and also contributes to the efficient use of the search engine's resources. This characteristic also potentially enhances the profitability of the search engine, as well as the profitability of the advertisers who place ads with the search engine.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 is a flowchart that shows one technique for computing a first subset of feature values.

FIG. 12 is a flowchart that shows one technique for computing a second subset of feature values.

Figure 1:
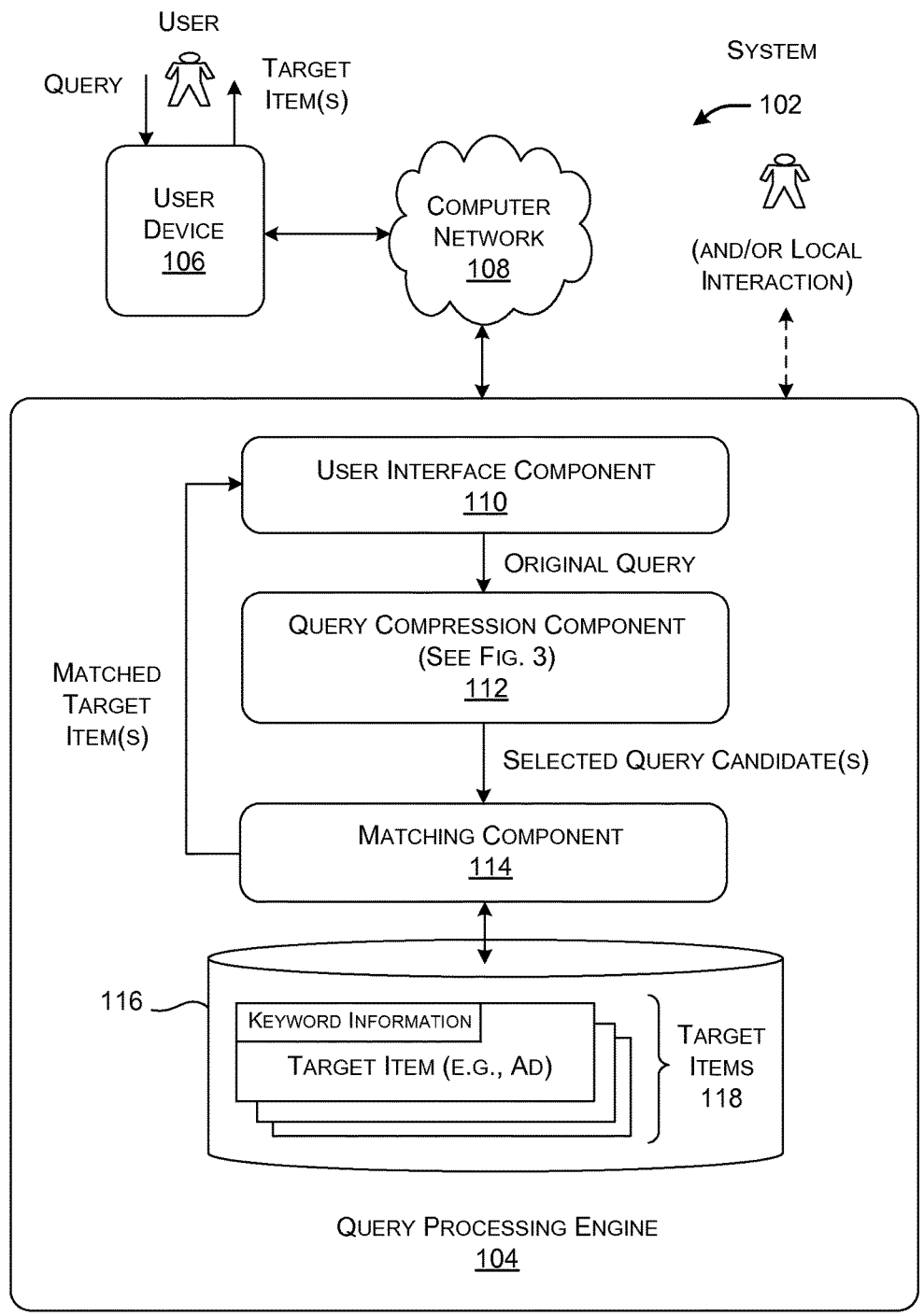
FIG. 1 shows an overview of a system for compressing queries, and for retrieving target items (e.g., ads) based on the compressed queries.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for compressing queries, and for retrieving target items (e.g., ads) based on the compressed queries. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. The various components shown in the figures can be implemented by various physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by various physical and tangible mechanisms, for instance, by software running on computer equipment, hardware (e.g., chip-implemented logic functionality), etc., and/or any combination thereof.

As to terminology, the phrase "configured to" encompasses various ways that physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses various instances of physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a system 102 that includes a query processing engine 104 for receiving an original query from a user. The original query includes a set of original tokens. For example, the tokens may correspond to words, phrases, numbers, other symbols, etc. in the original query. The query processing engine 104 identifies zero, one or more candidate queries based on the original query. Each candidate query contains a subset of tokens from the original query. For example, if the original query contains the words, "cheap private jet flights," one possible candidate query is "cheap private jet." Another is "private flights," etc. The query processing engine 104 then generates one or more target items (if any), each of which matches one or more candidate queries.

The query processing engine 104 may represent different functionality in different respective application scenarios. In one scenario, the query processing engine 104 represents a search engine. Here, the search engine expands the original query into one or more candidate queries (representing sub-queries of the original query). Then the search engine can then find one or more target items (if any) which match the candidate queries, based on any matching criteria.

In one case, the target items correspond to ads. Each ad has bidded keyword information associated therewith, made up of one or more tokens. The search engine matches a candidate query to an ad's keyword information by matching the tokens in the candidate query with the tokens in the ad's keyword information, based on any matching criteria. In another case, the target items correspond to network-accessible items of any type(s), such as web pages, annotated images, text-bearing documents, etc. Each network-accessible item may be associated with keyword information (such as metadata associated with an image, etc.). Here, the search engine matches a candidate query to a network-accessible item by matching the tokens in the candidate query with the tokens associated with the item's keyword information, based on any matching criteria.

In another example, the query processing engine 104 represents a digital assistant. The original query in this case corresponds to a question that a user has submitted to the digital assistant through any input modality (such as voice). The digital assistant then expands the original query into one or more candidate queries (representing sub-queries of the original query). Then the digital assistant can find one or more target items (if any) which match the candidate queries. The target items may correspond to responses to the user's questions. For example, one kind of response may constitute a text-based answer, while another kind of response may constitute an action to be performed (such as setting up a meeting appointment in a calendaring application). Each answer may be associated with keyword information. The digital assistant matches a candidate query to a response's keyword information by matching the tokens in the candidate query with the tokens associated with the response's keyword information, based on any matching criteria.

In the above-described examples, the query processing engine 104 operates to shorten an original query that is input by the user, and then compare the resultant shortened candidate queries against one or more target items. In addition, or alternatively, the query processing engine 104 can also produce compressed versions of the target items. For example, in another scenario, the query processing engine 104 compresses keyword information specified by an advertiser to one or more compressed versions of the original keyword information. The query processing engine 104 may then match a user's input query against the compressed versions of the keyword information, to identify one or more ads that match the user's input query. Hence, the terms "query" and "keyword information" are to be liberally construed herein as corresponding to any two strings, each of which is made up of a set of tokens.

Nevertheless, to facilitate and simplify the following explanation, it will henceforth be assumed that the query processing engine 104 represents a search engine. In that context, the search engine functions to match original queries against instances of keyword information associated with target items, such as digital ads.

The query processing engine 104 provides one or more benefits. For instance, by virtue of its query compression, the query processing engine 104 provides the most relevant target items to a user upon the user's submission of an original query. This characteristic results in good user experience because the user is not deluged with irrelevant target items. Further, the user receives the most relevant target items in an expeditious manner, without being required to hunt for those target items through an extended search session. This characteristic also contributes to the efficient use of the query processing engine's communication and processing resources. That is, by virtue of the fact that the user is quickly given relevant target items, the query processing engine 104 does not need to expend resources that would otherwise be required to conduct an extended search session.

Finally, the query processing engine 104 may increase the profitability of the advertisers and whatever entity administers the query processing engine 104. The advertisers benefit because they may sell more products and services through the improved placement of their ads. The entity which administers the query processing engine 104 benefits because an increased impression rate and/or click-through rate may increase the fees paid by the advertisers to the entity. An "impression" refers to an occasion in which the query processing engine 104 presents an ad to a user for the user's consideration. A "click" refers to an occasion in which a user clicks on or otherwise selects an ad that is presented to him or her.

With the above introduction, FIG. 1 will now be described in generally a top-to-bottom manner. In one case, the query processing system 104 represents a computer-implemented system that is implemented by one or more servers and other associated computing equipment (e.g., routers, load balancers, etc.). The computer-implemented system may be provided at a single site or may be distributed over plural sites.

A user may interact with the query processing engine 104 via a user device 106 of any type, via a computer network 108. For example, without limitation, the user device 106 may represent any of a desktop personal computing device, a laptop computing device, a game console device, a set-top box, a tablet-type computing device, a smartphone, a wearable computing device, and so on. The computer network 108 may represent a local area network, a wide area network (e.g., the Internet), one or more point-to-point communication links, or any combination thereof. The user device 106 may specifically access the services of the query processing engine 104 by connecting to a network address associated with the query processing engine 104. Note that FIG. 1 only shows a single user device 106, but any number of users may use respective user devices to interact with the query processing engine 104.

Further note that FIG. 1 shows an implementation in which the system 102 performs all processing on a user's query at the network-accessible query processing engine 104. But in other cases, the system 102 can distribute the query processing functionality between each user device and the query processing system 104. For example, one or more query processing components shown in FIG. 3 (to be described below) can be implemented by each user device, instead of, or in addition to, the query processing engine 104.

In yet another scenario, the query processing engine 104 represents a standalone application implemented by any user device. Here, the user may directly interact with the query processing engine 104 without necessarily communicating over the computer network 108.

The query processing engine 104 may include a user interface component 110. The user interface component 110 provides user interface functionality by which each user may interact with the query processing engine 104. For example, the user interface component 110 can provide a user interface presentation by which a user may submit an original query. The user interface component 110 may also provide one or more user interface presentations by which the query processing engine 104 may provide matching target items to the user. In one implementation, the user device 106 may interact with these user interface presentations via a browser application, such as INTERNET EXPLORER, provided by MICROSOFT CORPORATION of Redmond, Wash.

A query compression component 112 expands the user's original query into one or more sub-queries, referred to as candidate queries herein. Each candidate query includes a subset of the tokens in the original query. In one case, each candidate query does not transpose the order of tokens as they appear in the original query. For example, if the original query reads, "cheap private get flights," the query compression component 112 may produce a candidate query that reads, "private jet flights," but not "jet private flights." However, other implementations can remove this restriction.

A matching component 114 compares each candidate query with a collection of target items. As noted above, what is considered a "target item" can be variously construed, depending on the application of the system 102. In one scenario, the matching component 114 compares each candidate query with instances of bidded keyword information associated with a plurality of ads. The matching component 114 can then identify one or more instances of keyword information (and corresponding ads) that most closely match the candidate query, based on any matching criterion. The user interface component 110 may then send the user the identified ad(s).

A data store 116 stores a collection of target items 118. In one case, the data store 116 represents a single data store provided at a single physical location. In other cases, the data store 116 represents an underlying plurality of data stores, provided at a single location or distributed over a plurality of different locations. Indeed, the data store 116 may represent different storage sites coupled together via the Internet or other wide area network.

Figure 2:
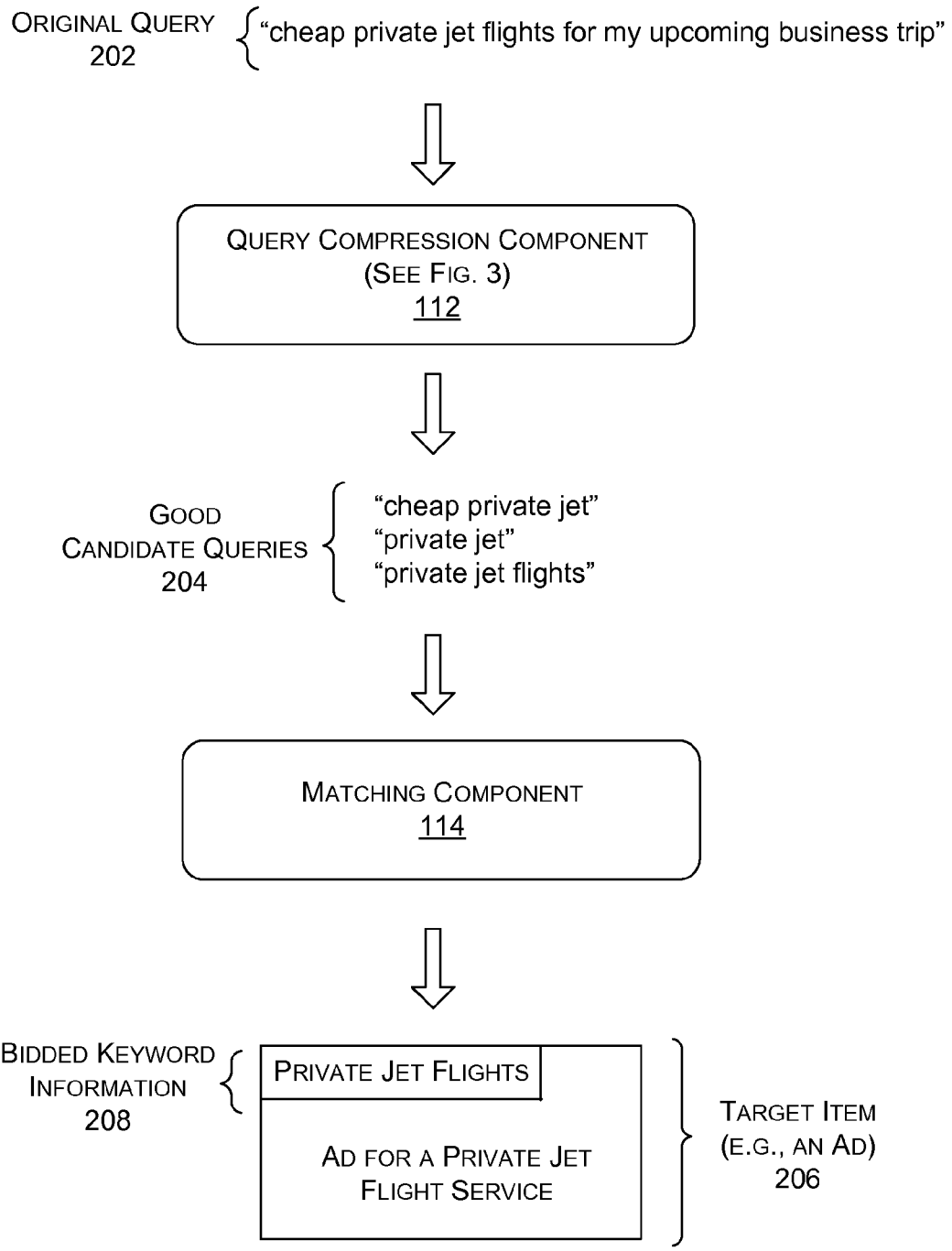
FIG. 2 shows an example of the application of the system of FIG. 1.

FIG. 2 shows one example of the operation of the system 102 of FIG. 1. In this case, a user provides a rather lengthy original query 202, "cheap private jet flights for my upcoming business trip," with the intent of locating an inexpensive private jet flight. The query compression component 112 identifies at least three candidate queries 204, including "cheap private jet," "private jet," and "private jet flights." Each candidate query is a sub-query of the original query 202, meaning it includes a subset of the tokens that appear in the original query 202. Note that the query compression component 112 has not identified any candidate queries including the phrase "for my upcoming business trip." This may be because the query compression component 112 has concluded that this trailing phrase is tangential to the user's true search intent.

The matching component 114 matches one or more of the candidate queries 204 with at least one target item 206. Here, the target item 206 corresponds to an ad associated with a private jet flight. More specifically, the target item 206 is associated with the keyword information 208, corresponding to the keywords "target jet flights." The matching component 114 determines that at least one candidate query matches the target item 206 because the tokens in those candidate query(ies) match the tokens of the keyword information 208. The target item 206 itself can having any type of content or combination of types of content, such as image content, text-bearing content, video content, audio content, etc.

Figure 3:
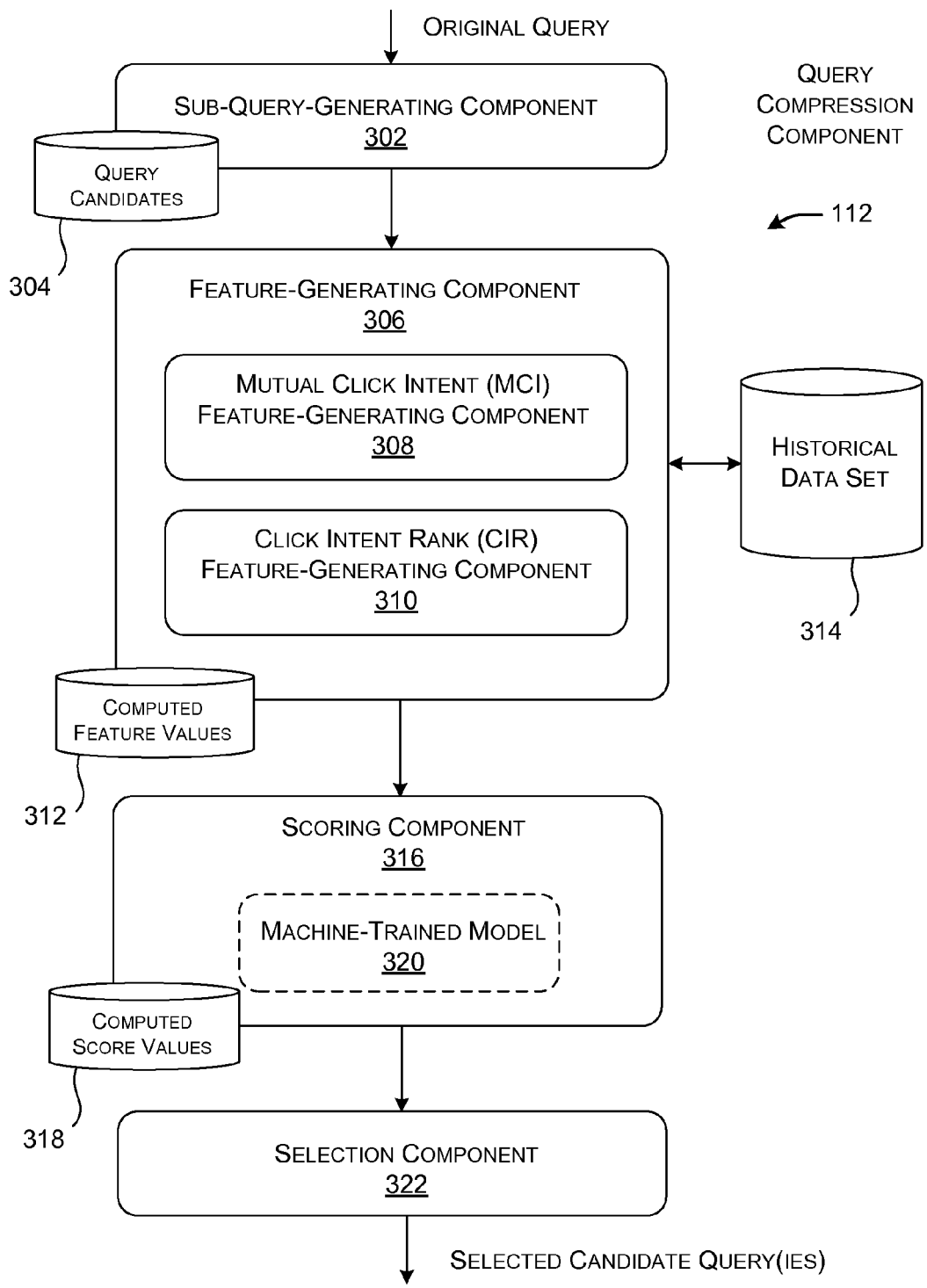
FIG. 3 shows one implementation of a query compression component, which is a part of the system of FIG. 1.

FIG. 3 shows one implementation of the query compression component 112. In one case, the query processing engine 104 (which corresponds to functionality provided by a network-accessible site), implements the entirety of the query compression component 112. In other cases, the system 102 can distribute the functions of the query compression component 112 among two or more components of the system 102. For example, each user device 106 can optionally perform one or more functions of the query compression component 112 in local fashion.

A sub-query-generating component 302 can first remove any stop words (such as "the," "of," "a," etc.) from the original query. The sub-query-generating component 302 can perform this task by comparing each token with a dictionary that identifies a list of stop words to be removed. Then the sub-query-generating component 302 breaks the remaining original query into one or more sub-queries, referred to herein as candidate queries. The sub-query-generating component 302 stores the candidate queries in a data sore 304. Each candidate query includes a subset of the tokens in the original query. Assuming that the original query has n tokens, each candidate query has a number of tokens m, where 2≤m≤n−1.

A feature-generating component 306 generates a set of feature values for each candidate query. Each feature value expresses some characteristic of the candidate query. More specifically, the feature-generating component 306 generates two types or classes of feature values. A mutual click intent (MCI) feature-generating component 308 generates a set of mutual coherence values (also referred to below as MCV values). A click intent rank (CIR) feature-generating component 310 generates a set of ranking values (also referred to below as CIR values). The explanation below will describe the meaning of these feature values in greater detail. The feature-generating component 306 stores the feature values that it generates in a data store 312.

By way of introduction, the feature-generating component 306 uses graph-based analysis to generate the feature values for each candidate query. The graph-based analysis relies on relationships among tokens expressed in a historical data set provided in a data store 314. As will be described in greater detail below (with reference to FIG. 5), the historical data includes a plurality of <query, keyword information> pairings. Each pairing identifies a query that one or more users have input to a search engine on a prior occasion, together with keyword information. The keyword information is associated with an ad that at least some of these users clicked on in response to submitting the query. A qualifying pairing is further constrained by requiring that the words in the keyword information are present in the query.

Because the graph-based analysis focuses on relationships among tokens in a query, it produces feature values that are context-dependent in nature. In other words, the same tokens may play a different role in other query contexts. That is, the graph-based analysis may conclude that a particular word is important when used in a first query, but not as important when used in a second query.

More specifically, the MCI feature-generating component 308 is particularly useful in identifying pairs of tokens that belong together and should preferably not be separated. For example, the MCI feature-generating component 308 can discount any candidate query which breaks the phrase "harry potter," which appears in the original query. The CIR feature-generating component 310 is particularly useful in identifying the importance of individual tokens in the expression of the intent associated with the original query. For example, the CIR feature-generating component 310 would conclude that the token "flowers" is important in the original query "cheap flowers free shipping," and hence, any sub-query that omitted "flowers" would be a poor candidate query.

A scoring component 316 generates a score value for each candidate query based on the feature values associated with that candidate query. The score value reflects an extent to which the sub-query captures the presumed intent of the original query. The scoring component 316 can store the thus-computed score values in a data store 318. In one case, the scoring component 316 can apply a machine-trained model 320 to compute the score values. For example, the machine-trained model 320 may correspond to a logistic regression model. The logistic regression model may compute the score value for a candidate query by forming a weighted sum of the feature values associated with the candidate query. An offline machine-learning process may iteratively compute the weight values of this sum based on another historical data set (that is, based on another historical data set compared to the data set that the feature-generating component 306 uses to compute the feature values).

In other cases, the machine-trained model 320 may represent any other type of machine-learned model, such as a deep-learning neural network, etc. Alternatively, or in addition, the scoring component 316 can use a manually-derived model to generate the score values. For instance, the manually-derived model may represent an equation, an algorithm, a rules-based engine, etc., or any combination thereof.

A selection component 322 selects zero, one, or more of the candidate queries based on the score values associated therewith. For example, the selection component 322 can choose the candidate queries with the top k score values. Alternatively, the selection component 322 can select all candidate queries that have a score value above an environment-specific threshold value. In some cases, the selection component 322 uses the selected candidate queries in the place of the original query. In other cases, the selection component 322 uses the selected candidate queries to supplement the original query.

Figure 4:
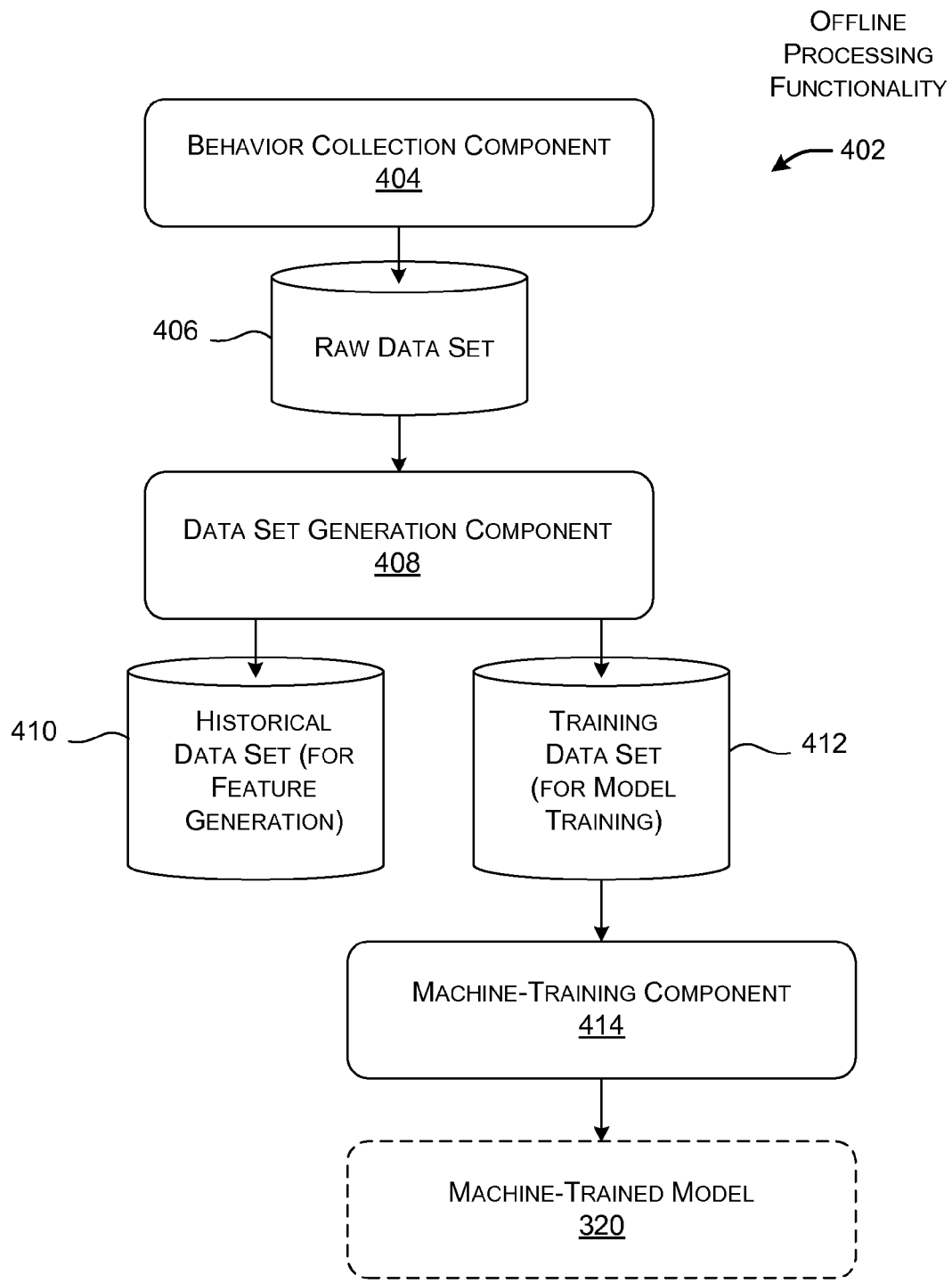
FIG. 4 shows processing functionality for generating data sets for use in conjunction with the query compression component of FIG. 3.

FIG. 4 shows offline processing functionality 402 for generating historical data sets. More specifically, the offline processing functionality 402 compiles a first data set for use by the feature-generating component 306 in generating the feature values. The offline processing functionality 402 compiles a second data set for use in generating the machine-trained model 320.

First, a behavior collection component 404 collects data that reflects the behavior of users in interacting with a search engine (or engines) over a span of time. For example, the behavior collection component 404 can store: (a) queries submitted by users to the search engine(s); (b) the keyword information associated with ads presented to the users in response to the queries that they have submitted; and (c) indications of whether the users clicked on (or otherwise selected) these ads upon their presentation. The behavior collection component 404 stores the data that it collects in a data store 406.

A data set generation component 408 generates a first data set by identifying all those <query, keyword information> pairings that have a number of impressions above a prescribed impression threshold (such as 1000). Out of this subset, the data set generation component 408 identifies parings for which: (a) the click-through-rate (CRT) is greater than a prescribed CRT upper-threshold value (e.g., 20%); and (b) all of the tokens in the keyword information exist in the query. Any pairing that meets this test is considered a positive example. For example, consider the case in which several users have clicked on an ad having the keyword information "private jet flights" after submitting the query "cheap private jet flights." Further assume that the click-through-rate of this pairing is above the prescribed CRT upper-threshold value. Note that all of the words in the keyword information are present in the query. Hence, this pairing constitutes a positive example. The data set generation component 408 stores all such positive examples in a data store 410. The feature-generating component 306 uses the data set in the data store 410 to compute the feature values.

The data set generation component 408 can also identify any <query, keyword information> paring that has a click-through-rate below a prescribed CRT lower-threshold value (e.g., 0.01%), and in which the keyword information is a sub-phrase of the query, as a negative example. The data set generation component 408 can store both the positive examples and the negative examples in a data store 412. A machine-training component 414 can operate on the data set in the data store 412 to generate the machine-trained model 320. For example, the machine-training component 414 can use a logistic regression approach to iteratively generate the weight values associated with a logistic regression model.

The offline processing functionality 402 can use other techniques to compute its data sets. For example, in addition to the technique described above, or alternatively, the behavior collection component 404 can randomly select <query, keyword information> pairings, where the query corresponds to a query submitted by one or more users, and the keyword information is associated with an ad that was presented to the user in response to the submission of the query. Further, the keyword information is a sub-phrase of the query. For each such pairing, the behavior collection component 404 can store a human evaluator's opinion as to whether the keyword information is relevant to the query. A pairing that that receives a "relevant" judgment is considered to be a positive example, while a pairing that receives a "not relevant" judgment is considered to be a negative example.

Figure 5:
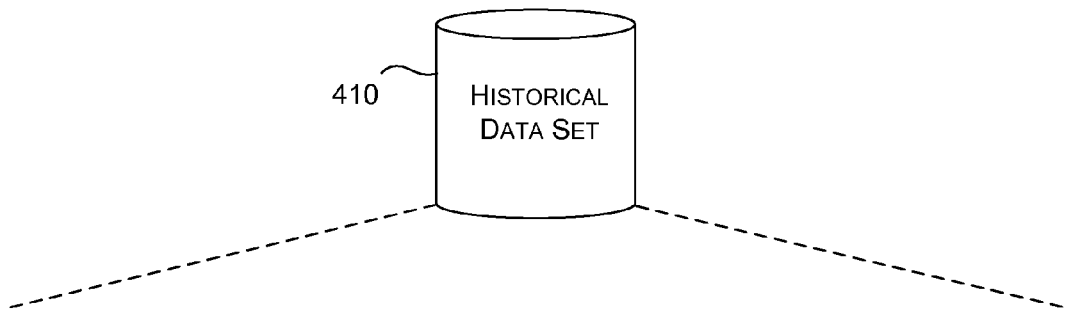
FIG. 5 shows a sample of one of the data sets produced by the processing functionality of FIG. 4.

FIG. 5 shows a small excerpt of the data set provided in the data store 410. The data set includes a set of <query, keyword information> pairings, corresponding to respective positive examples. Each such pairing specifies a query that a user has submitted, together with keyword information associated with an ad that was presented to the user in response to the submission of the query. To qualify as a positive example, each pairing has a click-through rate that satisfies the CRT upper-threshold value; further, all of the tokens in the keyword information are contained in the query.

A.2. MCI Feature-Generating Component

The mutual click intent (MCI) feature-generating component 308 calculates feature values for a candidate query by first expressing the original query as an undirected graph. The nodes in the undirected graph correspond to the tokens in the original query. The links between pairs of nodes in the graph represent the relationships among those pairs of nodes. Further, the MCI feature-generating component 308 assigns a mutual coherence value (MCV) to each link. The mutual coherence value represents a measure of the coherence between a pair of tokens ($v_i$, $v_j$) in the original query.

Figure 6:
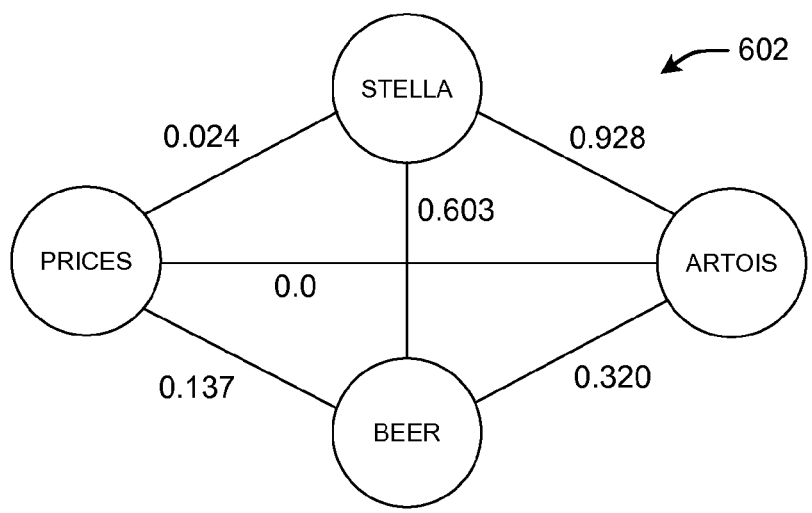
FIG. 6 shows an undirected graph associated with an original query submitted by the user.

For example, consider the original query "stella artois beer prices." A user enters this query with the intent of determining the price of a certain brand of beer, STELLA ARTOIS. As shown in FIG. 6, the MCI feature-generating component 308 generates an undirected graph 602 having nodes associated with the respective tokens in the original query. The MCI feature-generating component 308 also computes a mutual coherence value associated with each link. For example, the mutual coherence value between the tokens "stella" and "artois" is relatively high (0.928), whereas the mutual coherence value between the tokens "stella" and "prices" is relatively low (0.024). This result suggests that it would be a bad option to create a sub-query that entailed separating the tokens in the phrase "stella artois."

In one approach, the MCI feature-generating component 308 can generate each mutual coherence value (MCV) based on the data set in the data store 410 using the following equation:

$$MCV_{i,j} = \frac{N_{i,j}^{i,j}}{N_{i,j}^{i,j} + N_i^{i,j} + N_j^{i,j} + 1}. \quad (1)$$

In this equation, $N_{i,j}^{i,j}$ the number pairings in the data store 410 for which: (a) the query contains both of the tokens $v_i$ and $v_j$; and (b) the keyword information contains both $v_i$ and $v_j$. Further recall that each <query, keyword information> pairing in the data store 410 implicitly reflects the fact that users have clicked on the keyword information (or, more specifically, the ad associated with the keyword information) with a click-through-rate over the prescribed CRT upper-threshold value, in response to submitting the query. The term $N_i^{i,j}$ represents the number of pairings in the data store 410 for which: the query contains both $v_i$ and $v_j$; and (b) the keyword information contains only token $v_i$. The term $N_j^{i,j}$ represents the number of pairings in the data store 410 for which: (a) the query contains both $v_i$ and $v_j$; and (b) the keyword information contains only $v_j$. In one approach, the offline processing functionality (of FIG. 4) can compute the mutual coherence values between each set of possible pairs ($v_i$, $v_j$) as an offline process.

Figure 7:
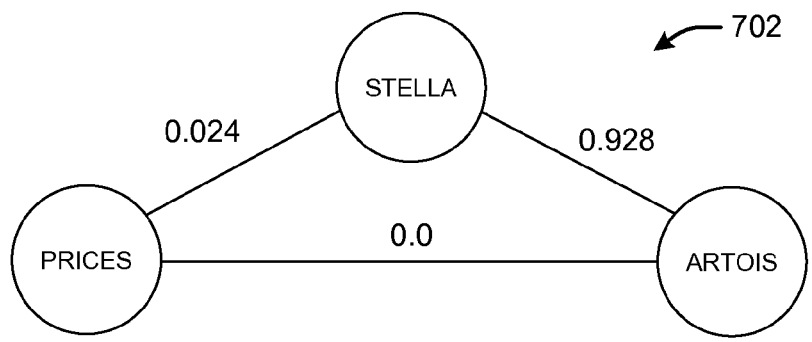
FIGS. 7 and 8 show two respective sub-graphs, corresponding to two different parts of the undirected graph shown in FIG. 6. The graphs of FIG. 6-8 are used to compute a first subset of feature values.
Figure 8:
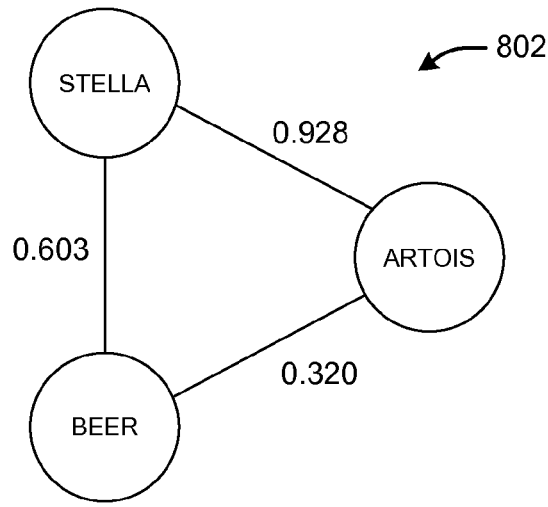

The MCI feature-generating component 308 then generates an undirected graph associated with each candidate query. The undirected graph associated with each sub-query includes part of the undirected graph associated with the original query. For example, FIG. 7 shows an undirected graph 702 associated with the candidate query "stella artois prices," while FIG. 8 shows an undirected graph 802 associated with the candidate query "stella artois beer." The collection of nodes in the undirected graph for the original query are denoted by V, while the collection of nodes in the undirected graph for a candidate query $q_s$ is denoted by $V_s$.

Next, the MCI feature-generating component 308 generates a set of feature values for each candidate query based on the mutual coherence values associated with the original query and the mutual coherence values associated with the candidate query. For example, the MCI feature-generating component 308 can generate four feature values for each candidate query using the following four respective equations:

$$f_1 = \frac{\sum_{v_i, v_j \in V_s} MCV_{i,j}}{\sum_{v_i, v_j \in V} MCV_{i,j}}; \qquad (2)$$

$$f_2 = \frac{\max_{v_i, v_j \in V_s} MCV_{i,j}}{\max_{v_i, v_j \in V} MCV_{i,j}}; \qquad (3)$$

$$f_3 = \frac{\sum_{v_i, v_j \in V_s} MCV_{i,j}/|E_s|}{\sum_{v_i, v_j \in V} MCV_{i,j}/|E|}; \text{ and} \qquad (4)$$

$$f_4 = \frac{\max_{v_i \in V_s, v_j \in V \setminus V_s} MCV_{i,j}}{\max_{v_i, v_j \in V} MCV_{i,j}}. \qquad (5)$$

Equation (2) divides the sum of mutual coherence values in the sub-graph (corresponding to the candidate query) by the sum of mutual coherence values in the full graph (corresponding to the original query). Equation (3) divides the maximum mutual coherence value in the sub-graph by the maximum mutual coherence value of the full graph. Equation (4) divides the average mutual coherence value associated with the sub-graph by the average mutual coherence value of the full graph. That is, in the fourth equation, $|E_s|$ represents the number of mutual coherence values (and associated links) in the sub-graph, while $|E|$ represents the number of mutual coherence values (and associated links) in the full graph. In the Equation (5), $v_j \in V \setminus V_s$ means any token $v_j$ that is present in the full graph V, but not also present in the sub-graph $V_s$. Overall, the Equation (5) divides the maximum mutual coherence value connecting the two distinct graphs, $V_s$ and $V \setminus V_s$, by the maximum coherence value in the full graph. In other words, Equation (5) captures the contextual information of the sub-query $q_s$ in the original query.

A.3. CIR Feature-Generating Component

The click intent rank (CIR) feature-generating component 310 calculates feature values for a candidate query by first expressing the original query as a directed graph. The nodes in the directed graph again correspond to the tokens in the original query. The links between pairs of nodes in the graph again represent the relationships among those pairs of nodes. Further, the CIR feature-generating component 310 assigns a transition probability value $e_{i,j}$ to each link. The transition probability value represents how likely it is to have a token $v_j$ in the keyword information if the token $v_i$ already exists in the original query and the keyword information. More specifically, each transition probability value $e_{i,j}$ between a pair of tokens $(v_i, v_j)$ can be computed by the following equation:

$$e_{i,j} = P(v_j | v_i) = \frac{N_{i,j}^{i,j} + 1}{N_{i,j}^{i,j} + N_i^{i,j} + 1}. \qquad (6)$$

Figure 9:
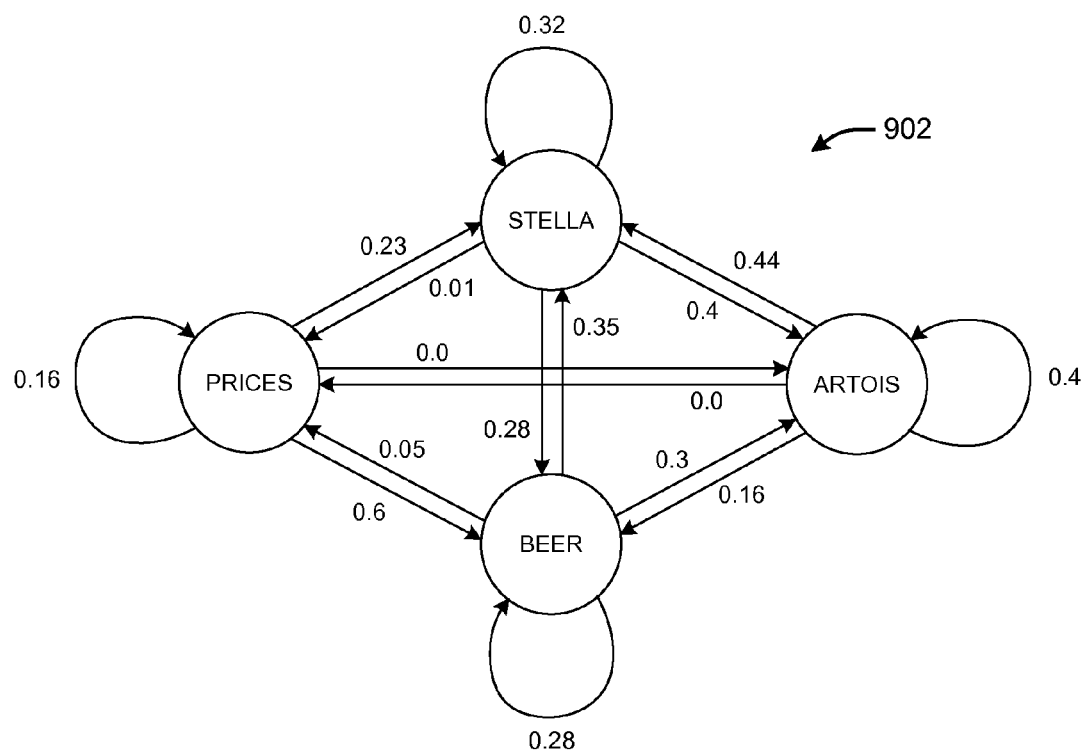
FIG. 9 shows a directed graph that is used to compute a second subset of feature values.

The terms $N_{i,j}^{i,j}$ and $N_i^{i,j}$ have the same meaning set forth above in Subsection A.2. FIG. 9 shows an illustrative graph 902 of the original query "stella artois beer prices." Each link from a first node $v_i$ to a second node $v_j$ is labeled with an illustrative transition probability value $e_{i,j}$, computed on the basis of the historical data in the data store 410.

Next, the CIR feature-generating component 310 uses a graph-based link analysis algorithm to generate a ranking value $CIR_i$ associated with each token $v_i$ in the directed graph. The ranking value $CIR_i$ reflects a relative importance of the token $v_i$ to the expression of the query intent, as reflected in the historical data set. The relative importance of any particular token $v_i$ in the directed graph, in turn, is based the importance of other tokens in the graph, as well as the strengths of the links which feed into the particular token $v_i$ (as expressed by the transition probability values associated with those links). More formally stated, the ranking values can be computed according to the following equation:

$$CIR^{t+1} = \alpha CIR^t E + (1-\alpha) U \qquad (7).$$

In this equation, $CIR_{1 \times n}^t$ represents a probability vector over each token at iteration t. In other words, $CIR_{1 \times n}^t$ represents the collection of ranking values $CIR_i$ for the tokens associated with the original query at iteration t. $CIR_{1 \times n}^{t+1}$ represents the probability vector over each token at iteration t+1. $E_{n \times n}$ represents the transition probability matrix between tokens, $U_{1 \times n}$ represents a constant vector, and $\alpha \in (0,1)$ is a damping factor. In one approach, the CIR feature-generating component 310 computes the $CIR_i$ values by: (1) choosing an initial value for $CIR^t$ (e.g., a uniform distribution), (2) using Equation (7) to compute $CIR^{t+1}$, and (3) repeating the calculation (with the values of $CIR^t$ being updated to correspond to the values of $CIR^{t+1}$). The CIR feature-generating component 310 repeats this iterative calculation until a desired degree of convergence is achieved with respect to the $CIR_i$ values.

Having now generating the $CIR_i$ values, the CIR feature-generating component 310 generates a sub-graph for each candidate query. Each sub-graph again represents a portion of the full graph associated with the original query. The set of nodes in the sub-graph for a candidate query is again represented by $V_s$, while the nodes in the full graph for the original query are represented by V.

Finally, the CIR feature-generating component 310 generates a set of feature values for each candidate query based on the ranking values in the sub-graph (associated with the candidate query) and the ranking values in the full graph (associated with the original query). More specifically, in one case, the CIR feature-generating component 310 can use the following equations to calculate six respective feature values:

$$f_5 = \frac{\sum_{v_i \in V_s} CIR_i}{\sum_{v_j \in V} CIR_j}; \qquad (8)$$

$$f_6 = \frac{\sum_{v_i \in V_s} CIR_i/|V_s|}{\sum_{v_j \in V} CIR_j/|V|}; \qquad (9)$$

-continued $$f_7 = \frac{\max_{v_i \in V_s} CIR_i}{\max_{v_j \in V} CIR_j};\qquad(10)$$

$$f_8 = \frac{\max_{v_i \in V \setminus V_s} CIR_i}{\max_{v_j \in V} CIR_j};\qquad(11)$$

$$f_9 = \frac{\sum_{v_i \in V \setminus V_s} CIR_i/|V \setminus V_s|}{\sum_{v_j \in V} CIR_j/|V|};\text{ and}\qquad(12)$$

$$f_{10} = \frac{(\Pi_{v_i \in V \setminus V_s} CIR_i)^{-|V \setminus V_s|}}{(\Pi_{v_j \in V} CIR_j)^{-|V|}}.\qquad(13)$$

Equation (8) divides the sum of ranking values in the sub-graph (corresponding to the candidate query) by the sum of the ranking values in the full graph (corresponding to the original query). Equation (9) divides the average ranking value associated with the sub-graph by the average ranking value of the full graph. Equation (10) divides the maximum ranking value in the sub-graph by the maximum ranking value of the full graph. Equation (11) divides the maximum ranking value in the graph $V \setminus V_s$ by the maximum raking value in the full graph. (Again note that $G \setminus G_s$ represents a graph formed by removing all of the nodes in $G_s$ from G.) Equation (12) represents the average ranking value in the graph $V \setminus V_s$ divided by the average ranking value in the full graph. Equation (12) forms the product of the ranking values in the graph $V \setminus V_s$ raises the product to the power of $-|V \setminus V_s|$, and then divides the result by a similarly computed value with respect to the full graph.

The ten features described above are cited by way of example, not limitation. Other implementations can include additional graph-based features (and/or non-graph-based features), and/or can omit any of the graph-based features described above.

B. Illustrative Processes

Figure 10:
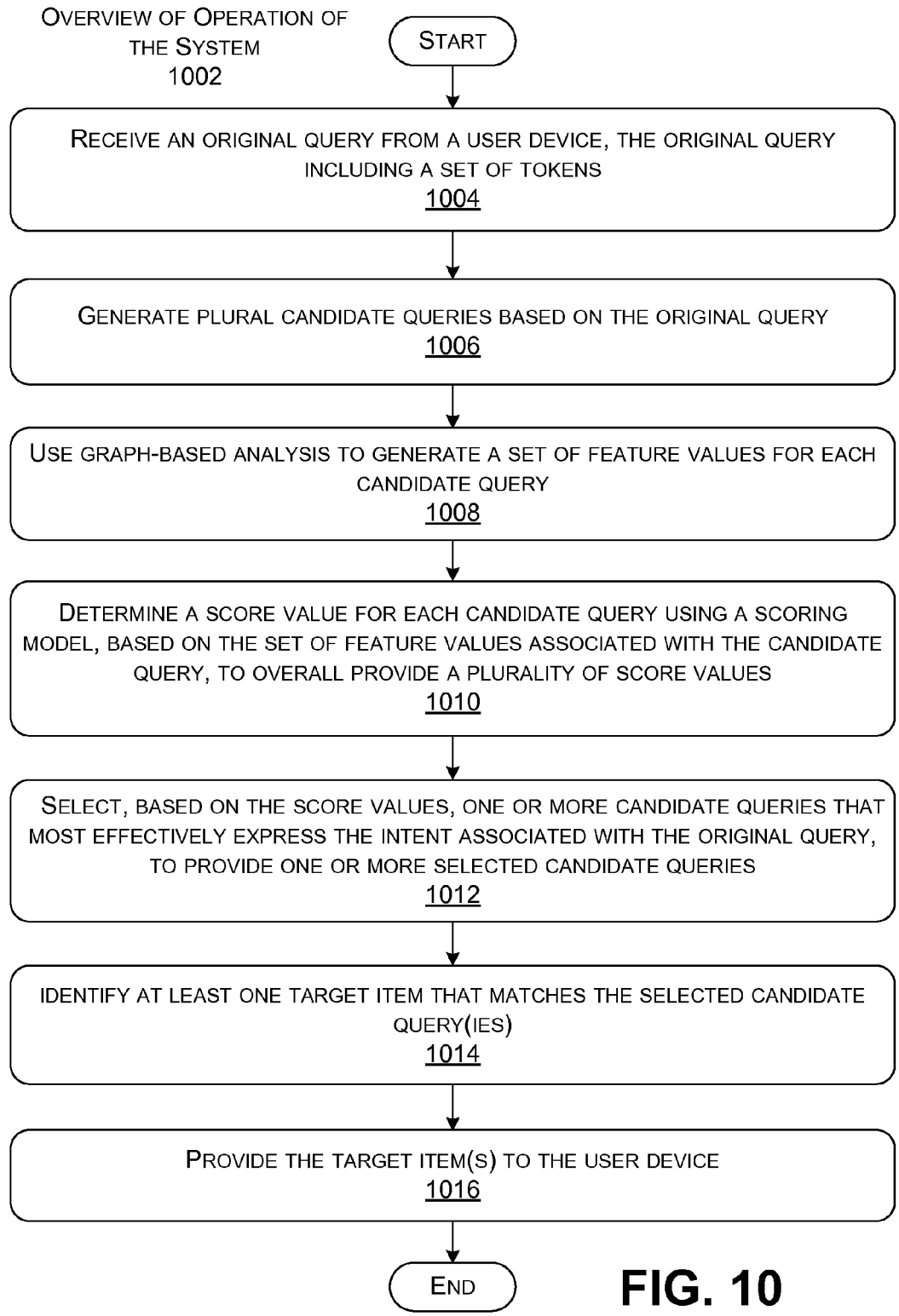
FIG. 10 is a flowchart that shows one manner of operation of the system of FIG. 1.

FIGS. 10-12 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

Starting with FIG. 10, this figure shows a process 102 that represents an overview of the operation of the system 102 of FIG. 1. In block 1004, the user interface component 110 receives an original query from a user device 106. The original query includes a set of tokens. Further, the original query is associated with an intent. In block 1006, the query compression component 112 generates plural candidate queries based on the original query, each candidate query corresponding to a sub-query that includes a subset of tokens selected from the set of tokens associated with the original query. In block 1008, the query compression component 112 uses graph-based analysis to generate a set of feature values for each candidate query, based on relationships among tokens expressed in a historical data set. In block 1010, the query compression component 112 determines a score value for each candidate query using a scoring model, based on the set of feature values associated with the candidate query; overall, the determining operation provides score values for the respective candidate queries. In block 1012, the query compression component 112 selects, based on the score values, one or more candidate queries that most effectively express the intent associated with the original query, to provide one or more selected candidate queries. In block 1014, the matching component 1014 identifies at least one target item that matches the selected candidate query(ies). In block 1016, the user interface component 110 provides the target item(s) to the user device.

FIG. 11 shows a process 1102 for generating a first set of (MCV) feature values for a particular sub-query. In block 1104, the MCI feature-generating component 308 forms an undirected graph associated with the original query, wherein each node in the undirected graph represents a token in the original query, and each link between two nodes has a mutual coherence value associated therewith that reflects a degree of coherence between a pair of tokens associated with the two respective nodes. In block 1106, the MCI feature-generating component 308 forms an undirected graph associated with the particular sub-query, corresponding to a part of the undirected graph associated with the original query. In block 1108, the MCI feature-generating component 308 generates feature values that reflect different respective functions of the mutual coherence values in the graph associated with the original query and the graph associated with the particular sub-query.

FIG. 12 shows a process 1202 for generating a second set of (CIR) feature values for a particular sub-query. In block 1204, the CIR feature-generating component 310 forms a directed graph associated with the original query, wherein each node in the directed graph represents a token in the original query, and each link from a first node to a second node has transition probability value associated therewith that reflects a probability of occurrence of a token associated with the second node, given a token associated with the first node. In block 1206, the CIR feature-generating component 310 applies a link analysis algorithm on the directed graph to generate a ranking value associated with each token in the original query, to overall provide a plurality of ranking values. In block 1208, the CIR feature-generating component 310 forms a directed graph associated with the particular sub-query, corresponding to a part of the directed graph associated with the original query. In block 1210, the CIR feature-generating component 310 generates feature values that reflect different respective functions of the ranking values in the graph associated with the original query and the graph associated with the particular sub-query.

C. Representative Computing Functionality

Figure 13:
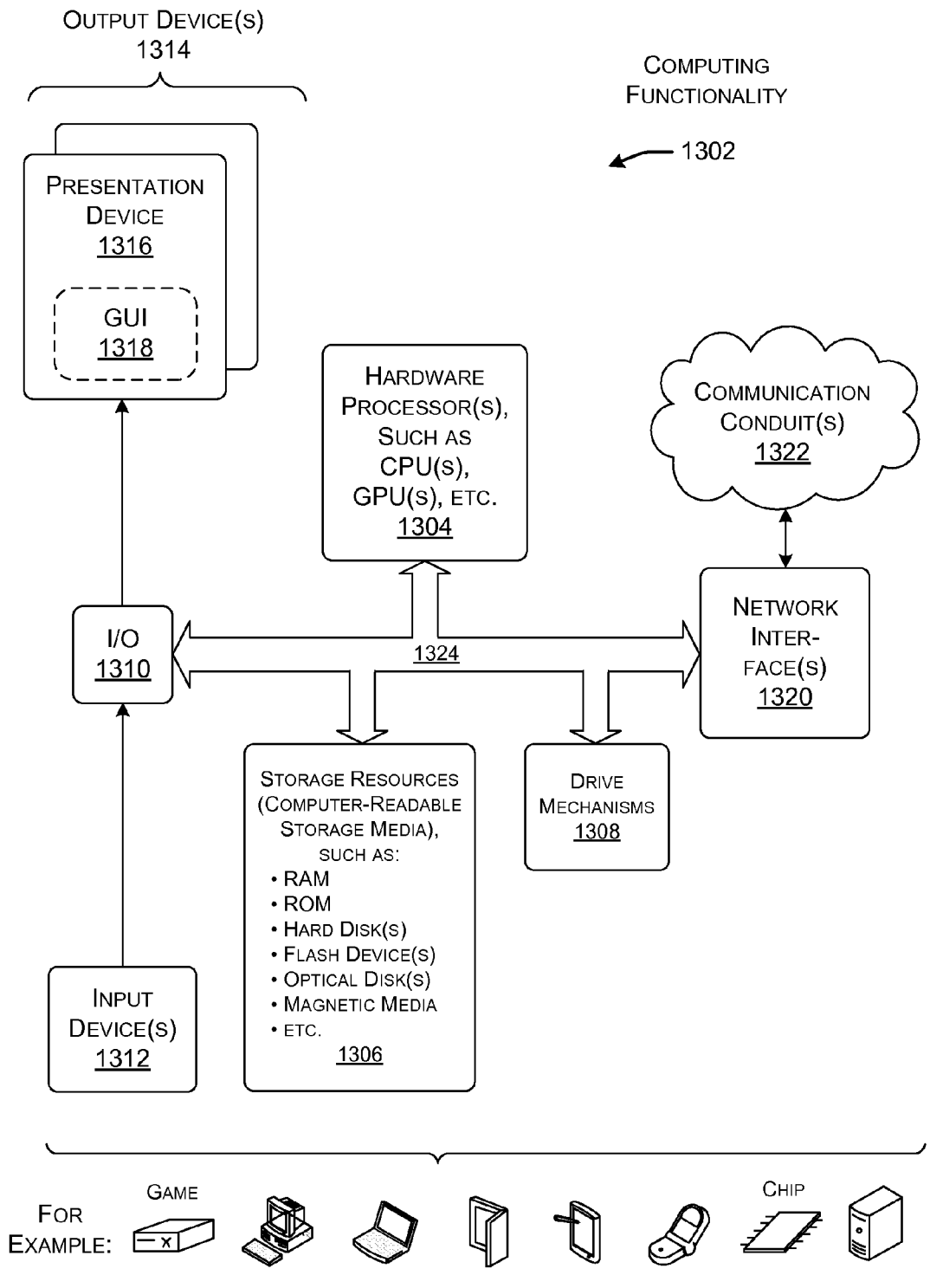
FIG. 13 shows illustrative computing functionality that can be used to implement any aspect of the features shown in the foregoing drawings.

FIG. 13 shows computing functionality 1302 that can be used to implement any aspect of the system 102 set forth in the above-described figures. For instance, the type of computing functionality 1302 shown in FIG. 13 can be used to implement the user device 106 and/or the query processing engine 104. In all cases, the computing functionality 1302 represents one or more physical and tangible processing mechanisms.

The computing functionality 1302 can include one or more hardware processors 1304, such as one or more central processing units (CPUs), and/or one or more graphical processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1302. The computing functionality 1302 may perform any of the functions described above when the hardware processor(s) 1304 carry out computer-readable instructions stored in any storage resource or combination of storage resources. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1316 and an associated graphical user interface presentation (GUI) 1318. The presentation device 1316 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described herein, performed using at least one hardware processor of one or more computing devices, for processing a query. The method includes: receiving an original query from a user device, the original query including a set of tokens, and the original query being associated with an intent; generating plural candidate queries based on the original query, each candidate query corresponding to a sub-query that includes a subset of tokens selected from the set of tokens associated with the original query; using graph-based analysis to generate a set of feature values for each candidate query, based on relationships among tokens expressed in a historical data set; determining a score value for each candidate query using a scoring model, based on the set of feature values associated with the candidate query, wherein, overall, the above-referenced determining provides score values for the respective candidate queries; selecting, based on the score values, one or more candidate queries that most effectively express the intent associated with the original query, to provide one or more selected candidate queries; identifying at least one target item that matches the above-referenced one or more selected candidate queries; and providing the above-referenced at least one target item to the user device.

According to a second aspect, the target item(s) correspond to at least one ad, and each ad is associated with bidded keyword information.

According to a third aspect, the above-referenced generating of the set of feature values for each candidate query, includes: generating a first subset of feature values based on mutual coherence values, each mutual coherence value reflecting a measure of coherence between a pair of tokens in the original query; and generating a second subset of feature values based on ranking values, each ranking value reflecting a relative importance of a corresponding token in the original query to a preservation of the intent associated with the original query.

According to a fourth aspect, the above-referenced generating of the first set of feature values for a particular sub-query includes: forming an undirected graph associated with the original query, wherein each node in the undirected graph represents a token in the original query, and each link between two nodes has a mutual coherence value associated therewith that reflects a degree of coherence between a pair of tokens associated with the two respective nodes; forming an undirected graph associated with the particular sub-query, corresponding to a part of the undirected graph associated with the original query; and generating feature values that reflect different respective functions of the mutual coherence values in the graph associated with the original query and the graph associated with the particular sub-query.

According to a fifth aspect, the above-referenced generating of the second set of feature values for a particular sub-query includes: forming a directed graph associated with the original query, wherein each node in the directed graph represents a token in the original query, and each link from a first node to a second node has transition probability value associated therewith that reflects a probability of occurrence of a token associated with the second node, given a token associated with the first node; applying a link analysis algorithm on the directed graph to generate a ranking value associated with each token in the original query, to overall provide a plurality of ranking values; forming a directed graph associated with the particular sub-query, corresponding to a part of the directed graph associated with the original query; and generating feature values that reflect different respective functions of the ranking values in the graph associated with the original query and the graph associated with the particular sub-query.

A sixth aspect corresponds to any combination (e.g., any permutation or subset) of the above-referenced first through fifth aspects.

A seventh aspect corresponds to any device counterpart, system counterpart, means-plus-function counterpart, computer-readable storage medium counterpart, data structure counterpart, article of manufacture counterpart, graphical user interface presentation counterpart, etc. associated with the first through sixth aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed using at least one hardware processor, the method comprising:
    receiving an original query from a user device, the original query including a set of tokens, and the original query being associated with an intent;
    generating plural candidate sub-queries based at least on the original query, the plural candidate sub-queries including subsets of tokens selected from the set of tokens included in the original query;
    forming a first full graph associated with the original query, wherein nodes in the first full graph represent the set of tokens in the original query, and links between the nodes have mutual coherence values associated therewith that reflect a degree of coherence between a pair of tokens associated with a pair of nodes, the mutual coherence values being based at least on relationships among the set of tokens expressed in a historical data set;
    generating a first set of feature values for the plural candidate sub-queries using functions including quotients based at least on the mutual coherence values in first sub-graphs associated with the plural candidate sub-queries and the mutual coherence values in the first full graph associated with the original query, the first sub-graphs corresponding to parts of the first full graph;
    forming a second full graph associated with the original query, wherein nodes in the second full graph represent the set of tokens in the original query, links between the nodes have transition probability values associated therewith that reflect a probability of occurrence of one token associated with one node given the other token associated with the other node, and the nodes in the second full graph having ranking values, the transition probability values being based at least on relationships among the set of tokens expressed in the historical data set;
    generating a second set of feature values for the plural candidate sub-queries using functions including quotients based at least on the ranking values in second sub-graphs associated with the plural candidate sub-queries and the ranking values in the second full graph associated with the original query, the second sub-graphs corresponding to parts of the second full graph;
    determining score values for the plural candidate sub-queries based at least on the first set of feature values and the second set of feature values, wherein the score values represent preservation of the intent associated with the original query;
    selecting, based at least on the score values, one or more candidate sub-queries to provide one or more selected candidate sub-queries;
    identifying at least one target item that matches the one or more selected candidate sub-queries; and
    providing the at least one target item to the user device.

2. The method of claim 1,
    wherein the at least one target item corresponds to at least one ad, and
    wherein the at least one ad is associated with bidded keyword information.

3. The method of claim 1, wherein the first full graph and the first sub-graphs are undirected graphs.

4. The method of claim 1, wherein the second full graph and the second sub-graphs are directed graphs.

5. The method of claim 1, wherein the score values are determined based at least on a weighted sum of the first set of feature values and the second set of feature values.

6. The method of claim 1, wherein:
    the first set of feature values are generated based at least on sums, maximums, and/or averages of the mutual coherence values in the first sub-graphs and of the mutual coherence values in the first full graph; and
    the second set of feature values are generated based at least on sums, maximums, averages, and/or products of the ranking values in the second sub-graphs and of the ranking values in the second full graph.

7. A system, comprising:
    at least one hardware processor; and
    at least one computer readable storage medium storing computer readable instructions which, when executed by the at least one hardware processor, cause the at least one hardware processor to:
        receive an original query from a user device, the original query including a set of tokens;
        generate plural candidate sub-queries based at least on the original query, the plural candidate sub-queries including subsets of tokens selected from the set of tokens included in the original query;
        generate a set of feature values for the plural candidate sub-queries by:
            forming a first full graph associated with the original query, wherein nodes in the first full graph represent the set of tokens in the original query, and links between the nodes have mutual coherence values associated therewith that reflect a degree of coherence between a pair of tokens associated with a pair of nodes the mutual coherence values being based at least on relationships among the set of tokens expressed in a historical data set;
            generating a first subset of feature values for the plural candidate sub-queries using functions including quotients based at least on the mutual coherence values in first sub-graphs associated with the plural candidate sub-queries and the mutual coherence values in the first full graph associated with the original query, the first sub-graphs corresponding to parts of the first full graph;
            forming a second full graph associated with the original query, wherein nodes in the second full graph represent the set of tokens in the original query, links between the nodes have transition probability values associated therewith that reflect a probability of occurrence of one token associated with one node given the other token associated with the other node, and the nodes in the second full graph having ranking values, the transition probability values being based at least on relationships among the set of tokens expressed in the historical data set; and generating a second subset of feature values for the plural candidate sub-queries using functions including quotients based at least on the ranking values in second sub-graphs associated with the plural candidate sub-queries and the ranking values in the second full graph associated with the original query, the second sub-graphs corresponding to parts of the second full graph;

determine score values for the plural candidate sub-queries using a scoring model based at least on the set of feature values, wherein the score values indicate preservation of an intent associated with the original query;

select, based at least on the score values, one or more candidate sub-queries to provide one or more selected candidate sub-queries;

identify at least one target item that matches the one or more selected candidate sub-queries; and provide the at least one target item to the user device.

8. The system of claim 7, wherein the at least one target item corresponds to at least one ad, and wherein the at least one ad is associated with bidded keyword information.

9. The system of claim 8, wherein the at least one target item is identified by matching the one or more selected candidate sub-queries with the bidded keyword information associated with the at least one ad, and wherein the at least one target item is provided to the user device by sending the at least one ad to the user device for presentation by the user device to a user.

10. The system of claim 7, wherein the first full graph and the first sub-graphs are undirected graphs.

11. The system of claim 10, wherein the mutual coherence value is generated based at least on a set of historical query-keyword pairs, individual historical query-keyword pairs specifying: (a) a prior query that has been submitted by at least one user; and (b) an instance of keyword information associated with a target item, wherein that target item has been selected by at least some users in response to submitting the prior query, and wherein the keyword information is a sub-phrase of the prior query.

12. The system of claim 11, wherein the mutual coherence value associated with the pair of tokens ($v_i$, $v_j$) is generated based at least on:

a number of pairings $N_{i,j}^{i,j}$ in which both of the tokens ($v_i$,$v_j$) appear in a particular prior query, and both of the tokens ($v_i$,$v_j$) appear in particular keyword information that is associated with the particular prior query;

a number of pairings $N_i^{i,j}$ in which both of the tokens ($v_i$, $v_j$) appear in the particular prior query, and just the token $v_i$ appears in the particular keyword information; and a number of pairings $N_j^{i,j}$ in which both of the tokens ($v_i$,$v_j$) appear in the particular prior query, and just the token $v_j$ appears in the particular keyword information.

13. The system of claim 7, wherein the second full graph and the second sub-graphs are directed graphs.

14. The system of claim 13, wherein the transition probability value is generated based at least on a set of historical query-keyword pairs, individual historical query-keywords specifying: (a) a prior query that has been submitted by at least one user; and (b) an instance of keyword information associated with a target item, wherein that target item has been selected by at least some users in response to submitting the prior query, and wherein the keyword information is a sub-phrase of the prior query.

15. The system of claim 14, wherein the transition probability value associated with a pair of tokens ($v_i$, $v_j$) is generated based at least on:

a number of pairings $N_{i,j}^{i,j}$ in which both of the tokens ($v_i$, $v_j$) appear in a particular prior query, and both of the tokens ($v_i$, $v_j$) appear in particular keyword information that is associated with the particular prior query; and a number of pairings $N_i^{i,j}$ in which both of the tokens ($v_i$, $v_j$) appear in the particular prior query, and just the token $v_i$ appears in the particular keyword information.

16. The system of claim 13, wherein the computer readable instructions, when executed by the at least one hardware processor, cause the at least one hardware processor to:

apply a link analysis algorithm on the second full graph associated with the original query to generate the ranking values, the link analysis algorithm identifying the ranking value associated with each particular token by identifying a measure of importance that is contributed to the particular token by each other token that is linked to the particular token.

17. The system of claim 7, wherein the scoring model is a logistic regression machine-learned model.

18. A computer-readable storage medium storing computer-readable instructions which, when executed by one or more hardware processors, cause the one or more hardware processors to perform acts comprising:

receiving an original query including a set of tokens;

generating plural candidate sub-queries based at least on the original query, the plural candidate sub-queries including subsets of tokens selected from the set of tokens;

forming a first full graph associated with the original query wherein nodes in the first full graph re resent the set of tokens in the original query, and links between the nodes have mutual coherence values associated therewith that reflect a degree of coherence between a pair of tokens associated with a pair of nodes, the mutual coherence values being based at least on relationships among the set of tokens expressed in a historical data set;

generating a first set of feature values for the plural candidate sub-queries using functions including quotients based at least on the mutual coherence values in first sub-graphs associated with the plural candidate sub-queries and the mutual coherence values in the first full graph associated with the original query, the first sub-graphs corresponding to parts of the first full graph;

forming a second full graph associated with the original query, wherein nodes in the second full graph represent the set of tokens in the original query, links between the nodes have transition probability values associated therewith that reflect a probability of occurrence of one token associated with one node given the other token associated with the other node, and the nodes in the second full graph having ranking values, the transition probability values being based at least on relationships among the set of tokens expressed in the historical data set;

generating a second set of feature values for the plural candidate sub-queries using functions including quotients based at least on the ranking values in second sub-graphs associated with the plural candidate sub-queries and the ranking values in the second full graph associated with the original query, the second sub-graphs corresponding to parts of the second full graph;

determining score values for the plural candidate sub-queries based at least on the first set of feature values and the second set of feature values, wherein the score values indicate preservation of an intent associated with the original query;

selecting, based at least on the score values, one or more candidate sub-queries to provide one or more selected candidate sub-queries; and providing an output result based at least on the one or more selected candidate sub-queries.

19. The computer-readable storage medium of claim 18, wherein the providing of the output result comprises identifying at least one ad having bidded keyword information that matches the one or more selected candidate sub-queries.

20. The computer-readable storage medium of claim 18, wherein:

the first set of feature values are generated based at least on sums, maximums, and/or averages of the mutual coherence values in the first sub-graphs and of the mutual coherence values in the first full graph; and the second set of feature values are generated based at least on sums, maximums, averages, and/or products of the ranking values in the second sub-graphs and of the ranking values in the second full graph.

* * * * *